United States Patent
Wassell et al.

(10) Patent No.: US 9,511,803 B2
(45) Date of Patent: Dec. 6, 2016

(54) DEPLOYABLE FLATBED FOR PICKUP TRUCK

(71) Applicant: GM Global Technology Operations LLC, Detroit, MI (US)

(72) Inventors: Scott P. Wassell, Leonard, MI (US); Scott C. Anderson, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/643,236

(22) Filed: Mar. 10, 2015

(65) Prior Publication Data
US 2016/0264191 A1   Sep. 15, 2016

(51) Int. Cl.
*B62D 33/03*   (2006.01)

(52) U.S. Cl.
CPC ..................... *B62D 33/03* (2013.01)

(58) Field of Classification Search
CPC ..................................................... B62D 33/03
USPC ........ 296/13, 14, 26.03, 26.11, 26.15, 183.1, 296/186.4, 61
See application file for complete search history.

(56) References Cited

U.S. PATENT DOCUMENTS

| | | | | |
|---|---|---|---|---|
| 6,644,708 B1 * | 11/2003 | Grzegorzewski | ......... | B60P 1/43 296/10 |
| 7,533,923 B1 * | 5/2009 | Caldwell | ................. | B60P 1/431 296/61 |
| 2006/0284439 A1 * | 12/2006 | Carroll | .................... | B60P 1/431 296/61 |
| 2007/0114813 A1 * | 5/2007 | Salvador | ................. | B60P 1/435 296/183.1 |
| 2007/0222247 A1 * | 9/2007 | Jaeck | ........................ | B60P 3/14 296/26.02 |
| 2008/0150311 A1 * | 6/2008 | Quigley | .................. | B60P 1/431 296/57.1 |
| 2008/0231075 A1 * | 9/2008 | Plavetich | .................. | B60P 3/06 296/183.1 |
| 2009/0108614 A1 * | 4/2009 | Washington | ............ | B60P 1/435 296/61 |
| 2012/0161470 A1 * | 6/2012 | Castillo | .............. | B62D 25/2054 296/183.1 |
| 2013/0094930 A1 * | 4/2013 | Kalergis | .................... | B60P 1/43 414/523 |
| 2014/0262583 A1 * | 9/2014 | Url | ....................... | B62D 63/025 180/233 |

* cited by examiner

*Primary Examiner* — Jason S Morrow
(74) *Attorney, Agent, or Firm* — BrooksGroup

(57) ABSTRACT

A number of variations may include a flatbed comprising a bed, a first wall, a second wall, and a third wall wherein the first wall and second wall are hingedly attached to the bed and are constructed and arranged to swing relative to the bed such that the first wall, the second wall, and the bed lie flat to define an enlarged upper surface of the bed, first wall, and second wall.

18 Claims, 2 Drawing Sheets

DEPLOYABLE FLATBED FOR PICKUP TRUCK

TECHNICAL FIELD

The field to which the disclosure generally relates includes flatbeds for vehicles.

BACKGROUND

The box of a pickup truck traditionally features a rear cargo area including a flat bed, three fixed walls, and a rear tailgate. Pickup trucks traditionally also include a trailer hitch for connection of a trailer.

SUMMARY OF ILLUSTRATIVE VARIATIONS

A number of variations may include a product that may include a flatbed that may include a bed, a first wall, a second wall, and a third wall wherein the first wall and the second wall may be hingedly attached to the bed and may be constructed and arranged to swing relative to the bed such that the first wall, the second wall, and the bed may lie flat to define an enlarged upper surface of the bed, first wall, and second wall.

Other variations may include a flatbed that may include a bed, a first wall, a second wall, and a third wall wherein the bed may include an upper surface, a lower surface opposite the upper surface, a first side, a second side and third side. The first wall may include the first surface and may be hingedly attached to the first side of the bed and may be constructed and arranged to swing relative to the bed such that the first surface of the first wall and the upper surface of the bed may lie flat and horizontally adjacent to one another. The second wall may include a second surface and may be hingedly attached to the second side of the bed and may be constructed and arranged to swing relative to the bed such that the second surface of the second wall and the upper surface of the bed may lie flat and horizontally adjacent to one another. The third wall may be fixed to the third side of the bed.

Other variations may include a flatbed that may include a bed, at least two wheel wells, a first wall, a second wall, and a third wall wherein the bed may include an upper surface, a lower surface opposite the upper surface, a first side, a second side, a third side, and the bed may further define at least a first cavity and wherein an extendable ramp may be disposed within the at least first cavity and may be constructed and arranged to extend from the first cavity. The lower surface of the bed may define a plurality of grooves that may include at least a first groove and second groove. The first wall may include a first surface and a first tongue running the length of the first wall and may be hingedly attached to the first side of the bed and may be constructed and arranged to swing relative to the bed such that first surface of the first wall and the upper surface of the bed may lie flat and horizontally adjacent to one another and such that the first tongue lies within the first groove of the plurality of grooves. The second wall may include a second surface and a second tongue running the length of the second wall and may be hingedly attached to the second side of the bed and may be constructed and arranged to swing relative to the bed such that the second surface of the second wall and the upper surface of the bed may lie flat and horizontally adjacent to one another and such that the second tongue may lie within the second the groove of the plurality of grooves. The third wall may be fixed to the third side of the bed.

Other illustrative variations within the scope of the invention will become apparent from the detailed description provided hereinafter. It should be understood that the detailed description and enumerated variations, while disclosing optional variations, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

A deployable flatbed for a pickup truck or other vehicle may include at least a bed and two side walls opposite each other. The two walls may be hingedly attached to the bed and may be constructed and arranged to swing outwardly from the flatbed such that an inner surface of each side wall may lie horizontally flat with the bed. In this way, a flatbed may increase the overall surface area of the bed portion thereby increasing the ability to carry goods, materials, vehicles, all-terrain vehicles, or any other cargo. Additionally, after the side walls have been lowered relative to the bed, the bed and side walls may be raised such that the surface of the bed and side walls may be flush with any optional wheel wells within the bed. Lastly, a deployable flatbed may include a number of extendable ramps which may be temporarily or permanently affixed to the bed and side walls such that vehicles or all-terrain vehicles, carts, or cargo pods may be driven up the ramps onto an enlarged upper surface of the bed of the deployable flatbed.

Figure 1:
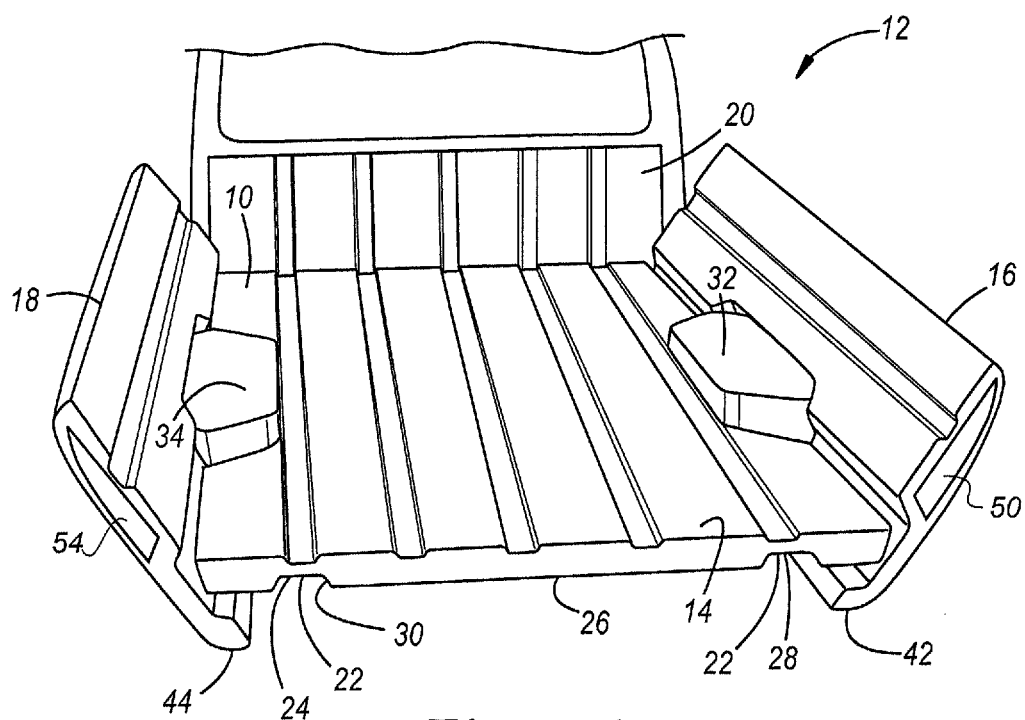
FIG. 1 illustrates one variation of a deployable flatbed.
Figure 2:
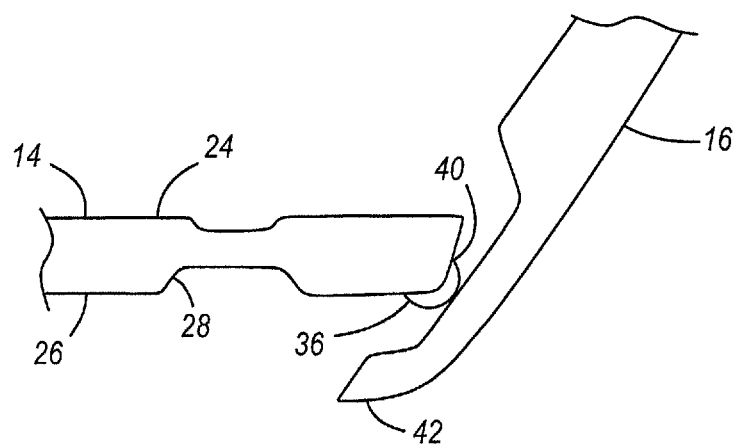
FIG. 2 illustrates one variation of a cross-sectional portion of a deployable flatbed.
Figure 3:
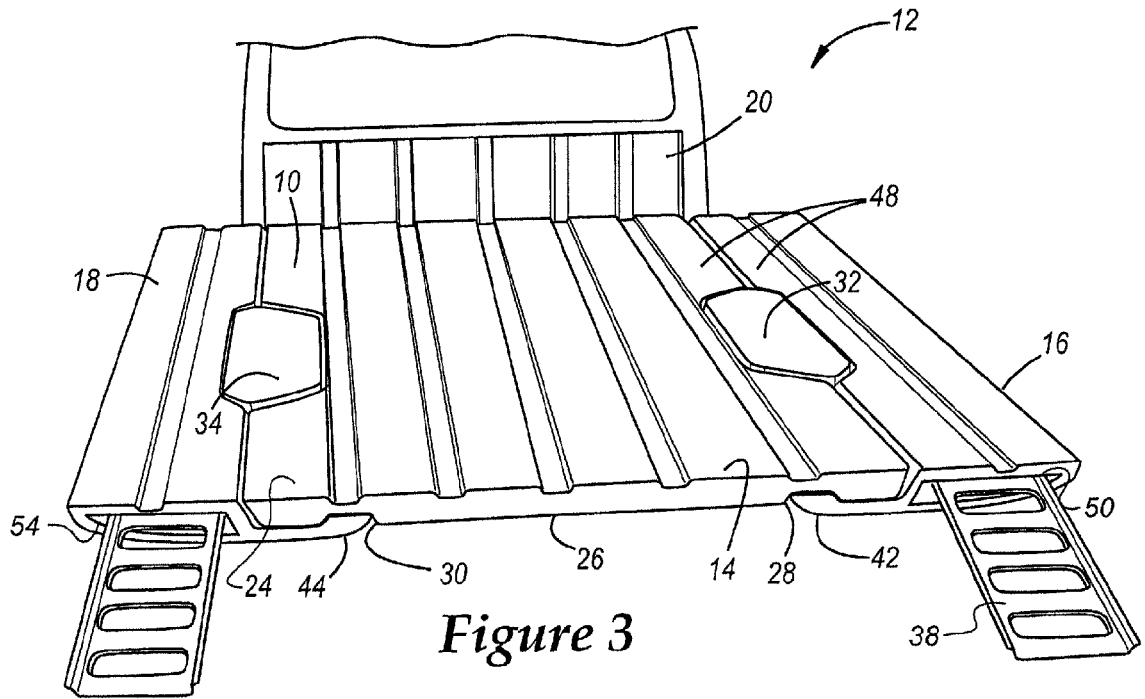
FIG. 3 illustrates one variation of a deployable flatbed.

Referring to FIGS. 1, 2, and 3, a vehicle 12 may include a flatbed 10 that may include a bed 14, a first wall 16, a second wall 18, and a third wall 20. The flatbed 10 may also include a tailgate (not shown). The bed 14 may include an upper surface 24 and a lower surface 26. The lower surface 26 of the bed 14 may define a plurality of grooves 22 that may include at least a first groove 28 and a second groove 30. The bed 14 may further include a first wheel well 32 and second wheel well 34. The first wall 16 may define a first cavity 50. The second wall 18 may define a second cavity 54. The first wall 16 and the second wall 18 may be hingedly attached to the bed 14. The hinged attachment between the first wall 16 and the bed 14 may include a plurality of rollers 36. The hinged attachment between the second wall 18 and the bed 14 may also include a plurality of rollers 36.

Referring now to FIG. 2, the hinged attachment of the first wall 16 and the bed 14 or the hinged attachment of the second wall 18 and bed 14 may include a plurality of rollers 36 that assist the first wall 16 or second wall 18 in swinging downwardly relative to the bed 14 and may further include a plurality of hinges 40. The bed 14 may include an upper surface 24 and a lower surface 26. The lower surface 26 may further include a first groove 28 and a second groove 30. The first wall 16 may further include a first tongue 42 extending the length of the first wall 16 and may be constructed and arranged to lie within the first groove 28 of the bed 14 when the first wall 16 is deployed. Likewise, the second wall 18 may include a second tongue 44 that may extend the length of the second wall 18 and may be constructed and arranged to fit within the second groove 30 of the lower surface 26 when the second wall 18 is deployed.

Referring now to FIG. 3, the bed 14, first wall 16 and second wall 18 may be constructed and arranged to move vertically such that the upper surface 24 of the bed 14 and the inner surfaces of the first wall 16 and second wall 18 may be flush with a portion of the first wheel well 32 and the second wheel well 34 to define an enlarged upper surface 48.

Figure 4:
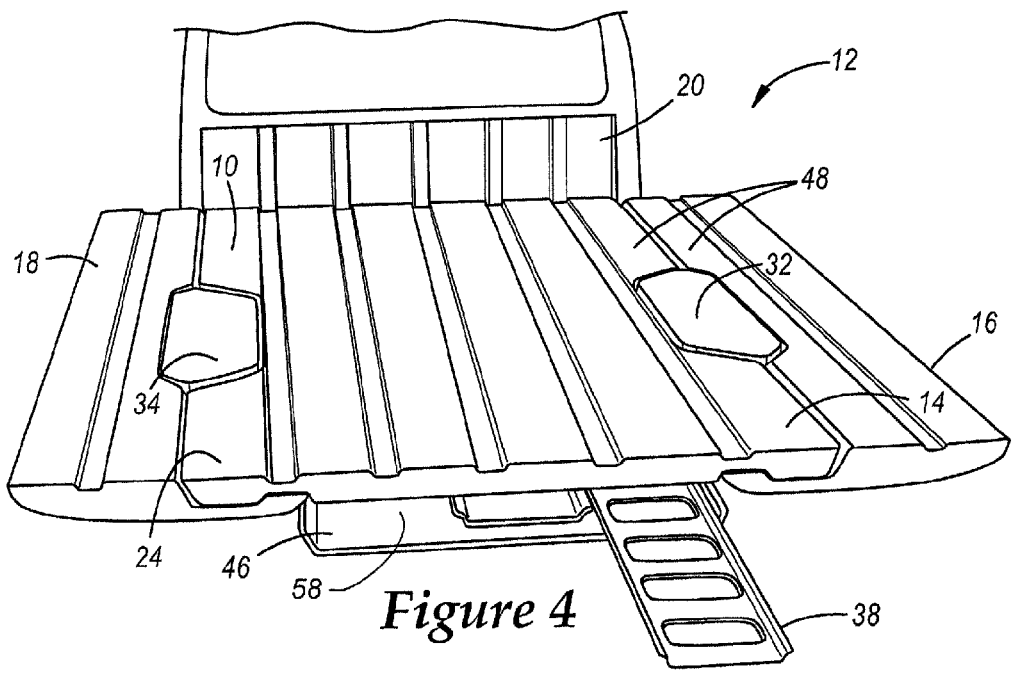
FIG. 4 illustrates one variation of a deployable flatbed.

Referring now to FIG. 4, a tray 46 may be disposed beneath the bed 14 and may be constructed and arranged to hold a plurality of extendable ramps 38 that may be constructed and arranged to temporarily or permanently attach to the bed 14, first wall 16, or second wall 18 such that cargo or vehicles may be moved into the bed 14. Alternatively, the bed 14, first wall 16, second wall 18, may define a first cavity 50, second cavity 54 or third cavity 58 that may be constructed and arranged to hold extendable ramps for similar purposes.

According to Variation 1, a product may include a flatbed that may include a bed, a first wall, a second wall, and a third wall wherein the first wall and the second wall may be hingedly attached to the bed and may be constructed and arranged to swing relative to the bed such that the first wall, the second wall and the bed may lie flat to define an enlarged upper surface of the bed, first wall and the second wall.

Variation 2 may include a product as set forth in Variation 1 wherein the bed may define at least a first cavity and wherein an extendable ramp may be disposed within the at least first cavity and may be constructed and arranged to extend from the first cavity.

Variation 3 may include a product as set forth in Variations 1 or 2 wherein the first wall may define at least a second cavity and wherein an extendable ramp may be disposed within the at least second cavity and may be constructed and arranged to extend from the second cavity.

Variation 4 may include a product as set forth in any of Variations 1 through 3 wherein the second wall may define at least a third cavity and wherein an extendable ramp may be disposed within the at least third cavity and may be constructed and arranged to extend from the third cavity.

Variation 5 may include a product as set forth in any of Variations 1 through 4 wherein the first wall may include a first surface, the second wall may include a second surface, and wherein the first wall and the second wall may be hingedly attached to the bed and may be constructed and arranged to swing relative to the bed such that the first surface of the first wall, the second surface of the second wall, and an upper surface of the bed may lie flat to define an enlarged upper surface of the bed, first wall, and second wall.

Variation 6 may include a product as set forth in Variation 5 wherein the first wall may include a first tongue running the length of the first wall, the second wall may include a second tongue running the length of the second wall and the bed may include a lower surface defining a plurality of grooves wherein the first wall and second wall are hingedly attached to the bed and may be constructed and arranged to swing relative to the bed such that the first wall, the second wall, and the bed may lie flat to define an enlarged upper surface of the bed, first wall, and second wall wherein the first tongue may lie within a first groove of plurality of grooves and the second tongue may lie within a second groove of the plurality of grooves.

Variation 7 may include a product as set forth in any of Variations 1 through 6 wherein the flatbed may further include at least two raised wheel wells.

Variation 8 may include a product as set forth in any of Variations 1 through 7 wherein the bed, the first wall, and the second wall may be constructed and arranged to rise vertically such that the enlarged upper surface and the at least two raised wheel wells may be level relative to one another.

Variation 9 may include a product as set forth in any of Variations 1 through 8 wherein the bed may further include a tailgate.

According to Variation 10, a product may include a flatbed that may include a bed, a first wall, a second wall, and a third wall wherein the bed may include an upper surface, a lower surface opposite the upper surface, a first side, a second side and a third side. The first wall may include a first surface and may be hingedly attached to the first side of the bed and may be constructed and arranged to swing relative to the bed such that the first surface of the first wall and the upper surface of the bed may lie flat and horizontally adjacent to one another. The second wall may include a second surface and may be hingedly attached to the second side of the bed and may be constructed and arranged to swing relative to the bed such that the second surface of the second wall and the upper surface of the bed may lie flat and horizontally adjacent to one another. The third wall may be fixed to the third side of the bed.

Variation 11 may include a product as set forth in Variation 10 wherein the first wall may further include a first tongue running the length of the first wall, the second wall may further include a second tongue running the length of the second wall and the lower surface of the bed may define a plurality of grooves wherein the first wall and second wall may be hingedly attached to the bed and may be constructed and arranged to swing relative to the bed such that the first surface of the first wall, second surface of the second wall, and the upper surface of the bed may lie flat to define an enlarged upper surface of the bed, first wall, and second wall wherein the first tongue may lie within a first groove of the plurality of grooves and the second tongue may lie within a second groove of the plurality of grooves.

Variation 12 may include a product as set forth in any of Variations 10 through 11 wherein the flatbed may further include at least two raised wheel wells on the upper surface.

Variation 13 may include a product as set forth in any of Variations 10 through 12 wherein the bed, the first wall, and the second wall may be constructed and arranged to rise vertically such that the enlarged upper surface and the at least two raised wheel wells are level.

Variation 14 may include a product as set forth in any of Variations 10 through 13 wherein the bed may further define at least a first cavity and wherein an extendable ramp may be disposed within the at least first cavity and may be constructed and arranged to extend from the first cavity.

Variation 15 may include a product as set forth in any of Variations 10 through 14 wherein the first wall may define at least a second cavity and wherein an extendable ramp may be disposed within the at least second cavity and may be constructed and arranged to extend from the second cavity and wherein the second wall may define at least a third cavity and wherein an extendable ramp may be disposed within the at least third cavity and may be constructed and arranged to extend from the third cavity.

Variation 16 may include a product as set forth in any of Variations 10 through 15 wherein the first wall may define at least a second cavity and wherein an extendable ramp may be disposed within the at least second cavity and may be constructed and arranged to extend from the second cavity.

Variation 17 may include a product as set forth in any of Variations 10 through 16 wherein the second wall may define at least a third cavity and wherein an extendable ramp may be disposed within the at least third cavity and may be constructed and arranged to extend from the third cavity.

Variation 18 may include a product as set forth in any of Variations 10 through 17 and may further include a tray disposed beneath the bed and a plurality of extendable ramps disposed within the tray which may be constructed and arranged to allow a vehicle to travel up the ramps and onto the ramp.

Variation 19 may include a product as set forth in any of Variations 10 through 18 and may further include a tailgate hingedly attached to the bed.

According to Variation 20, a product may include a flatbed including a bed, at least two wheel wells, a first wall, a second wall, and a third wall wherein the bed may include an upper surface, a lower surface opposite the upper surface, a first side, a second side, a third side, and the bed may further define at least a first cavity and wherein an extendable ramp may be disposed within the at least first cavity and may be constructed and arranged to extend from the first cavity. The lower surface of the bed may define a plurality of grooves that may include at least a first groove and a second groove. The first wall may include a first surface and a first tongue running the length of the first wall and may be hingedly attached to the first side of the bed and may be constructed and arranged to swing relative to the bed such that the first surface of the first wall and the upper surface of the bed lie flat and horizontally adjacent to one another and such that the first tongue lies within the first groove of the plurality of grooves. The second wall may include a second surface and a second tongue running the length of the second wall and may be hingedly attached to the second side of the bed and may be constructed and arranged to swing relative to the bed such that the second surface of the second wall and the upper surface of the bed may lie flat and horizontally adjacent to one another and such that the second tongue may lie within the second groove of the plurality of grooves. The third wall may be fixed to the third side of the bed.

The above description of variations of the invention is merely demonstrative in nature and, thus, variations thereof are not to be regarded as a departure from the spirit and scope of the inventions disclosed within this document.

What is claimed is:

1. A product comprising:
   a flatbed comprising a bed comprising a lower surface, a first wall, a second wall, and a third wall wherein the first wall and second wall are hingedly attached to the bed and are constructed and arranged to swing relative to the bed such that the first wall, the second wall, and the bed lie flat to define an enlarged upper surface of the bed, first wall, and second wall; and
   wherein the first wall further comprises a first tongue running the length of the first wall, the second wall furthers comprises a second tongue running the length of the second wall, and the lower surface of the bed defines a plurality of grooves wherein the first wall and second wall are hingedly attached to the bed and are constructed and arranged to swing relative to the bed such that the first surface of the first wall, the second surface of the second wall, and the upper surface of the bed lie flat to define an enlarged upper surface of the bed, first wall, and second wall wherein the first tongue lies within a first groove of the plurality of grooves and the second tongue lies within a second groove of the plurality of grooves.

2. A product as set forth in claim 1 wherein the bed defines at least a. first cavity and wherein an extendable ramp is disposed within the at least first cavity and is constructed and arranged to extend from the first cavity.

3. A product as set forth in claim 1 wherein the first wall defines at least a second cavity and wherein an extendable ramp is disposed within the at least second cavity and is constructed and arranged to extend from the second cavity.

4. A product as set forth in claim 1 wherein the second wall defines at least a third cavity and wherein an extendable ramp is disposed within the at least third cavity and is constructed and arranged to extend from the third cavity.

5. A product as set forth in claim 1 wherein the first wall comprises a first surface, the second wall comprises a second surface, and wherein the first wall and second wall are hingedly attached to the bed and are constructed and arranged to swing relative to the bed such that the first surface of the first wall, the second surface of the second wall, and an upper surface of the bed lie flat to define an enlarged upper surface of the bed, first wall, and second wall.

6. A product comprising:
   a flatbed comprising a bed, a first wall, a second wall, and a third wall wherein the first wall and second wall are hingedly attached to the bed and are constructed and arranged to swing relative to the bed such that the first wall, the second wall, and the bed lie flat to define an enlarged upper surface of the bed, first wall, and second wall:
   wherein the first wall comprises a first surface, the second wall comprises a second surface, and wherein the first wall and second wall are hingedly attached to the bed and are constructed and arranged to swing relative to the bed such that the first surface of the first wall, the second surface of the second wall, and an upper surface of the bed lie fiat to define an enlarged upper surface of the bed, first wall, and second wall; and
   wherein the first wall comprises a first tongue running the length of the first wall, the second wall comprises a second tongue running the length of the second wall, and the bed comprises a lower surface defining a plurality of grooves wherein the first wall and second wall are hingedly attached to the bed and are constructed and arranged to swing relative to the bed such that the first wall, the second wall, and the bed lie flat to define an enlarged upper surface of the bed, first wall, and second wall wherein the first tongue lies within a first groove of the plurality of grooves and the second tongue lies within a second groove of the plurality of grooves.

7. A product as set forth in claim I wherein the flatbed further comprises at least two raised wheel wells.

8. A product as set forth in claim 1 further comprising a tailgate.

9. A product comprising:
   a flatbed comprising a bed, a first wall, a second wall, and a third wall wherein the bed comprises an upper surface, a lower surface opposite the upper surface comprising a plurality of grooves thereon, a first side, a second side, and a third side;
   the first wall comprises a first tongue running the length of the first wall and a first surface and is hingedly attached to the first side of the bed and is constructed and arranged to swing relative to the bed such that the first surface of the first wall and the upper surface of the bed lie flat and horizontally adjacent to one another;
   the second wall comprises a second tongue running the length of the second wall and a second surface and is hingedly attached to the second side of the bed and is constructed and arranged to swing relative to the bed such that the second surface of the second wall and the upper surface of the bed lie flat and horizontally adjacent to one another; and
   the third wall is fixed to the third side of the bed.

10. A product comprising;
    a flatbed comprising a bed, a first wall, a second wall, and a third wall wherein the bed comprises an upper surface, a lower surface opposite the upper surface, a first side, a second side, and a third side;
    wherein the first wall comprises a first surface and is hingedly attached to the first side of the bed and is constructed and arranged to swing relative to the bed such that the first surface of the first wall and the upper surface of the bed lie flat and horizontally adjacent to one another;
    wherein the second wall comprises a second surface and is hingedly attached to the second side of the bed and is constructed and arranged to swing relative to the bed such that the second surface of the second wall and the upper surface of the bed lie flat and horizontally adjacent to one another;
    wherein the third wall is fixed to the third side of the bed; and
    wherein the first wall further comprises a first tongue running the length of the first wall, the second wall furthers comprises a second tongue running the length of the second wall, and the lower surface of the bed defines a plurality of grooves wherein the first wall and second wall are hingedly attached to the bed and are constructed and arranged to swing relative to the bed such that the first surface of the first wail, the second surface of the second wall, and the upper surface of the bed lie flat to define an enlarged upper surface of the bed, first wall, and second wall wherein the first tongue lies within a first groove of the plurality of grooves and the second tongue lies within a second groove of the plurality of grooves.

11. A product as set forth in claim 9 wherein the flatbed further comprises at least two raised wheel wells on the upper surface.

12. A product as set forth in claim 9 wherein the bed further defines at least a first cavity and wherein an extendable ramp is disposed within the at least first cavity and is constructed and arranged to extend from the first cavity.

13. A product as set forth in claim 12 wherein the first wall defines at least a second cavity and wherein an extendable ramp is disposed within the at least second cavity and is constructed and arranged to extend from the second cavity and wherein the second wall defines at least a third cavity and wherein an extendable ramp is disposed within the at least third cavity and is constructed and arranged to extend from the third cavity.

14. A product as set forth in claim 9 wherein the first wall defines at least a second cavity and wherein an extendable ramp is disposed within the at least second cavity and is constructed and arranged to extend from the second cavity.

15. A product as set forth in claim 9 wherein the second wall defines at least a third cavity and wherein an extendable ramp is disposed within the at least third cavity and is constructed and arranged to extend from the third cavity.

16. A product as set forth in claim 9 further comprising a tray disposed beneath the bed and a plurality of extendable ramps disposed within the tray constructed and arranged to allow a vehicle to travel up the ramps and onto the bed.

17. A product as set forth in claim 9 further comprising a tailgate.

18. A product comprising:
    a flatbed comprising a bed, at least two wheel wells, a first wall, a second wall, and a third wall wherein the bed comprises an upper surface, a lower surface opposite the upper surface, a first side, a second side, a third side, and the bed further defines at least a first cavity and wherein an extendable ramp is disposed within the at least first cavity and is constructed and arranged to extend from the first cavity;
    the lower surface of the bed defines a plurality of grooves comprising at least a first groove and a second groove;
    the first wall comprises a first surface and a first tongue running the length of the first wall and is hingedly attached to the first side of the bed and is constructed and arranged to swing relative to the bed such that the first surface of the first wall and the upper surface of the bed lie flat and horizontally adjacent to one another and such that the first tongue lies within the first groove of the plurality of grooves;
    the second wall comprises a second surface and a second tongue running the length of the second wall and is hingedly attached to the second side of the bed and is constructed and arranged to swing relative to the bed such that the second surface of the second wall and the upper surface of the bed lie flat and horizontally adjacent to one another and such that the second tongue lies within the second groove of the plurality of grooves; and
    the third wall is fixed to the third side of the bed.

* * * * *